(12) United States Patent
Fujino et al.

(10) Patent No.: US 7,304,124 B2
(45) Date of Patent: Dec. 4, 2007

(54) PROCESS FOR STRIPPING VOLATILE SUBSTANCES FROM DISPERSION COMPRISING POLYMER PARTICLES AND PROCESS FOR PRODUCING TONER

(75) Inventors: Takeo Fujino, Tokyo (JP); Kazuhiro Sato, Tokyo (JP)

(73) Assignee: Zeon Corporation, Tokyo (JP)

( * ) Notice: Subject to any disclaimer, the term of this patent is extended or adjusted under 35 U.S.C. 154(b) by 0 days.

(21) Appl. No.: 10/493,216

(22) PCT Filed: Nov. 1, 2002

(86) PCT No.: PCT/JP02/11465

§ 371 (c)(1),
(2), (4) Date: Apr. 25, 2005

(87) PCT Pub. No.: WO03/040196

PCT Pub. Date: May 15, 2003

(65) Prior Publication Data

US 2005/0176925 A1    Aug. 11, 2005

(30) Foreign Application Priority Data

Nov. 5, 2001    (JP)    ............................. 2001-339815

(51) Int. Cl.
   *C08F 6/00*    (2006.01)
(52) U.S. Cl. ...................... 528/502 R; 95/254; 95/263; 524/458; 524/460; 528/500; 585/825; 585/833; 585/868
(58) Field of Classification Search ................ 95/254, 95/263; 524/458, 460; 528/500, 502 R; 585/825, 833, 868
   See application file for complete search history.

(56) References Cited

U.S. PATENT DOCUMENTS 4,971,879 A    11/1990    Kimura et al.
5,414,193 A *  5/1995    Taylor et al. ............... 585/833
5,516,818 A    5/1996    Chen et al.
5,756,574 A *  5/1998    Baumstark et al. ......... 524/460

FOREIGN PATENT DOCUMENTS

| JP | 01-217464 | 8/1989 |
|----|-----------|--------|
| JP | 03-015858 | 1/1991 |
| JP | 03-175456 | 7/1991 |
| JP | 03-243954 | 10/1991 |
| JP | 05-066613 | 3/1993 |
| JP | 11-015192 | 1/1999 |
| JP | 2000-321809 | 11/2000 |
| WO | 00/68741 | 11/2000 |
| WO | WO 00/68741 A | 11/2000 |

OTHER PUBLICATIONS

A copy of the European Patent Office Communication with Supplementary European Search Report for corresponding European patent application No. 02775475, dated Jul. 20, 2006. (Citing References AA and AB).

* cited by examiner

*Primary Examiner*—Terressa Boykin
(74) *Attorney, Agent, or Firm*—Armstrong, Kratz, Hanson, Quintos & Brooks LLP (57) ABSTRACT

A stripping process is provided which continuously strips volatile substances from a dispersion containing a polymer particles through stripping the volatile substances from a dispersion by blowing an inert gas into the dispersion to draw the volatile substances into the inert gas, removing the volatile substances from the gas mixture of the inert gas and the stripped volatile substances and circulating the purified inert gas obtained by removing the volatile substances from the gas mixture, and blowing the purified inert gas into the dispersion. Also provided is a production process for a toner which uses this stripping process.

16 Claims, 2 Drawing Sheets

PROCESS FOR STRIPPING VOLATILE SUBSTANCES FROM DISPERSION COMPRISING POLYMER PARTICLES AND PROCESS FOR PRODUCING TONER

TECHNICAL FIELD

The present invention relates to a process for stripping volatile substances from a dispersion comprising a polymer particles, and more particularly relates to a stripping process which can efficiently strip and remove volatile substances by blowing an inert gas into a dispersion comprising a polymer particles.

The present invention also relates to a process for producing a toner in which this stripping process is applied in the production process of a polymerized toner. In accordance with the method of the present invention, the amount of volatile substances such as residual polymerizable monomers is low, whereby polymer particles that are excellent in environmental safety, in particular for an electrophotographic toner, can be obtained.

BACKGROUND ART

Generally, electrophotographic toners are roughly divided into pulverized toners and polymerized toners. Pulverized toners are obtained by kneading components such as a colorant, a charge control agent and a releasing agent into a polymerized binder resin, then grinding and classifying the kneaded product. On the other hand, polymerized toners are obtained as colored polymer particles by polymerizing a mixture containing constituents such as a polymerizable monomer, a colorant, a charge control agent and a releasing agent using suspension polymerization, emulsion polymerization, dispersion polymerization or the like, then if needed agglomerating or aggregating.

For either of these techniques it is difficult to completely react the polymerizable monomer during the polymerization step, causing trace amount of unreacted polymerizable monomer to remain in the toner. If toner containing residual polymerizable monomers is used in an electrostatic imaging apparatus, residual polymerizable monomers are vaporized out of the toner by heating in the image fixing step, for example. This worsens the working environment and emits an offensive odor. Further, electrophotographic toners which contain a large amount of volatile substances like residual polymerizable monomers cause problems such as blocking during storage, offsetting during image fixing or filming on an electrostatic imaging apparatus members.

In case of pulverized toner, volatile substances such as residual polymerizable monomers can be easily removed during the binder resin production step or removed by heating to a high temperature during mixing and kneading of the binder resin, colorant, charge control agent and releasing agent.

For polymerized toners it is also necessary to remove volatile substances from the colored polymer particles that contain additive constituents such as a colorant, a charge control agent and a releasing agent after the polymerization step. However, unreacted polymerizable monomers are easily adsorbed on these additive constituents, making it difficult to decrease the amount thereof. Among polymerized toners, it is especially difficult to decrease volatile substances in low temperature fixable toners, because the toner tends to agglomerate when an attempt is made to remove the volatile substances such as the residual polymerizable monomer by heating at high temperature.

After the polymerization step, the dispersion comprising the colored polymer particles in polymerized toners is generally subjected to washing, dewatering and drying post treatment. To reduce the amount of volatile substances, such as residual polymerizable monomers, contained in polymerized toners, processes for removing volatile substances during these post treatment processes are known. Among such processes, treating the dispersion comprising the colored polymer particles before dewatering is being heavily investigated.

For example, Japanese Patent Application Laid-Open No. 5-66613 proposes a method which involves first suspension-polymerizing a polymerizable monomer in an aqueous medium, then distilling of the aqueous medium while it is being added to the suspension liquid. Although this publication discloses that a polymerized toner having a low amount of residual monomers can be obtained by using this method, it does not confirm to what extent residual monomers are actually removed from the polymerized toner. This method not only requires a large amount of aqueous medium, but the residual monomer elution rate from the polymerized toner particles is not very high. This publication goes on to disclose a method for distilling off an aqueous medium while heating at the peak top temperature or higher of the polymerized toner endothermic peak. Specifically, this publication discloses in Example 1 that water was distilled off while being added so that the amount of suspension liquid did not change while heating the suspension liquid at 150° C. under reduced pressure. These temperature conditions are well above water's boiling point, meaning that while distillating off of the water medium is possible, polymerized toner particles would tend to agglomerate or adhere to the apparatus, thereby decreasing productivity.

The present inventors proposed in Japanese Patent Application Laid-Open No. 2000-321809 a method which involves first subjecting to a low-pressure stripping process a dispersion of polymer particles obtained after a polymerization reaction has finished, which contains a colorant and a binder resin component, then drying. However, after further investigation it was found that under one of the processing conditions, the dispersion comprising the polymer particles foams in this low-pressure stripping process, whereby stable processing cannot be performed. It was also found that a large amount of time and heat is required in order to reduce the concentration of the residual polymerizable monomer to a predetermined concentration. For these reasons, a reduction method which is highly efficient and gives consideration to energy conservation has been desired.

Thus, while there have previously been various investigations into reducing the amount of volatile substances, such as residual polymerizable monomers, contained in a polymerized toner by treatment after polymerization, an adequate reduction method which is efficient and gives consideration to energy conservation is yet to be found.

DISCLOSURE OF THE INVENTION

It is an object of the present invention to provide a process for efficiently stripping volatile substances from a dispersion comprising a polymer particles which is obtained through polymerization in an aqueous medium.

It is a further object of the present invention to provide a process for producing a toner which can strip efficiently and with stability volatile substances such as residual polymerizable monomer from a dispersion comprising a colored polymer particles to give a polymerized toner having low amounts of volatile substances such as residual polymerizable monomers, and does not have an offensive odor.

The present inventors have carried out an extensive investigation with a view toward achieving the above objects. As a result, they have focused their attention on a process for stripping volatile substances from a dispersion comprising a polymer particles obtained by polymerization in an aqueous medium, which comprises blowing an inert gas into the dispersion to draw the volatile substances into the inert gas.

As the result of further research, the present inventors have arrived at a method for continuously stripping volatile substances from a dispersion comprising a polymer particles by removing volatile substances from a gas mixture containing stripped volatile substances, circulating the purified inert gas removed of its volatile substances, then blowing this purified inert gas into the dispersion.

The process according to the present invention can efficiently strip volatile substances from a dispersion comprising a polymer particles obtained by polymerizing in an aqueous medium. The process according to the present invention can also perform stripping at a temperature of less than 100° C. and circulate an inert gas used for stripping. In addition, the process can perform stripping without exhausting volatile substances out of the system. In view of these advantages, the process according to the present invention conserves energy, improves productivity and is excellent in protecting the environment.

In the process according to the present invention, the rate with which volatile substances such as unreacted polymerizable monomers are removed from the dispersion comprising the polymer particles can be increased by circulating and using a purified inert gas. The process according to the present invention can also perform stripping while suppressing foaming at the surface of the liquid. In addition, the process according to the present invention can perform stripping while preventing the polymer particles agglomerating or adhering to the apparatus.

If the stripping process according to the present invention is arranged in the production process of a polymerized toner, a toner can be efficiently produced which contains a low amount of volatile substances such as residual polymerizable monomers and does not have an offensive odor. The present invention has been achieved based on such knowledge.

In view of this, according to the present invention, a process is provided for stripping volatile substances from a dispersion comprising a polymer particles obtained by polymerization in an aqueous medium, wherein (A) the volatile substances are stripped from the dispersion by blowing an inert gas into the dispersion to draw the volatile substances into the inert gas;

(B) volatile substances are removed from the gas mixture of the inert gas and the stripped volatile substances; and (C) stripping of the volatile substances from the dispersion is continued by circulating a purified inert gas obtained by removing the volatile substances from the gas mixture, and blowing the purified inert gas into the dispersion.

The present invention also provides a process for producing a toner, comprising a colored polymer particles, which comprises: the first step for generating colored polymer particles by polymerizing, in an aqueous medium, a polymerizable monomer composition comprising a polymerizable monomer and a colorant, the second step for stripping treatment of a dispersion comprising the colored polymer particles and the third step for getting in the colored polymer particles from the dispersion after completion of the stripping treatment; wherein, after the first step is completed, the second step for stripping treatment is carried out by:

(a) stripping the volatile substances from the dispersion by blowing an inert gas into the dispersion to draw the volatile substances into the inert gas;

(b) removing the volatile substances from the gas mixture of the inert gas and the stripped volatile substances; and (c) continuing stripping of the volatile substances from the dispersion by circulating a purified inert gas obtained by removing the volatile substances from the gas mixture, and blowing the purified inert gas into the dispersion.

BEST MODE FOR CARRYING OUT THE INVENTION

The stripping process according to the present invention strips volatile substances from a dispersion comprising a polymer particles by blowing an inert gas into the dispersion, removing volatile substances from a stripped gas mixture, then circulating the purified gas in the stripping step for use in the course of stripping volatile substances from a dispersion comprising a polymer particles obtained by polymerization in an aqueous medium.

Examples of the dispersion comprising the polymer particles include, but are not limited to, (i) a dispersion containing a polymer particles obtained by polymerizing, in an aqueous medium, a polymerizable monomer or a polymerizable monomer composition comprising a polymerizable monomer; (ii) a dispersion containing a colored polymer particles obtained by polymerizing, in an aqueous medium, a polymerizable monomer composition comprising a polymerizable monomer and a colorant; and (iii) a dispersion containing a core-shell structure colored polymer particles obtained by generating colored polymer particles by polymerizing, in an aqueous medium, a polymerizable monomer composition comprising a polymerizable monomer and a colorant, then polymerizing a polymerizable monomer for shell in the presence of the colored polymer particles. Stripping treatment may be performed using the dispersion comprising the polymer particles obtained during the polymerization step as is, or by adjusting the concentration by appropriate dilution using water as the dispersion medium.

Volatile substances for the stripping process according to the present invention include the dispersion medium used in the production of the polymer particles, residual unreacted polymerizable monomers, a polymerization initiator and their degradation products. Where the polymer particles are colored polymer particles used for a toner, such matter is volatized off when the toner is imaged and heat fixed. Typical examples of this are residual polymerizable monomers. Even though a portion of water as the dispersion medium is drawn into the inert gas and stripped during the stripping, water is removed during the post treatment process by filtering, washing or drying. Thus, the volatile substances which are the object of the present invention are mainly organic compounds such as unreacted polymerizable monomers, which will be made clear from the respective explanatory passages.

The stripping process according to the present invention strips volatile substances from a dispersion comprising a polymer particles by blowing an inert gas into the dispersion to draw the volatile substances into an inert gas.

Ordinarily, the stripping process according to the present invention provides a dispersion comprising a polymer particles to a stripping apparatus for stripping in the apparatus. Any apparatus which is capable of performing stripping may be used as the stripping apparatus. Specific examples include an evaporator and a stripping column.

The inert gas to be used in the stripping process according to the present invention includes nitrogen gas, dried air, carbon dioxide gas, a noble gas or a mixed gas of two or more thereof. From a cost and safety perspective, nitrogen gas and dried air are preferable from amongst these gases. The inert gas may be used alone or used by mixing two or more. In the present invention "inert gas" means a gas which does not react with the polymer particles, or dispersion medium and does not change or breakdown those constituents.

In the stripping process according to the present invention, the manner in which the inert gas is blown into the dispersion comprising the polymer particles includes (i) blowing the inert gas using a gas blowing pipe; (ii) blowing by using a gas dispersion plate; and (iii) blowing by using both the above methods.

If the blowing the inert gas using a gas blowing pipe is employed, the gas blowing pipe may be of any shape as long as the inert gas can be blown into the dispersion. A variety of shapes are possible for the gas blowing pipe, wherein generally a straight pipe having a fixed diameter or which tapers off towards one tip is preferable.

The shape of the blowing aperture for the gas blowing pipe is not particularly limited, and may be a circular or oval shape. However, while the cross-section of the blowing aperture may be the same, provision of a plurality of small-diameter pipes or providing a porous material at the tip is preferable because stripping can be performed more efficiently since the contact surface of the blown inert gas and the polymer particle dispersion solution is increased. When using a porous material, a porous material comprised of ceramic or metal which is usually used in aeration or air diffusion can be preferably used.

Figure 1:
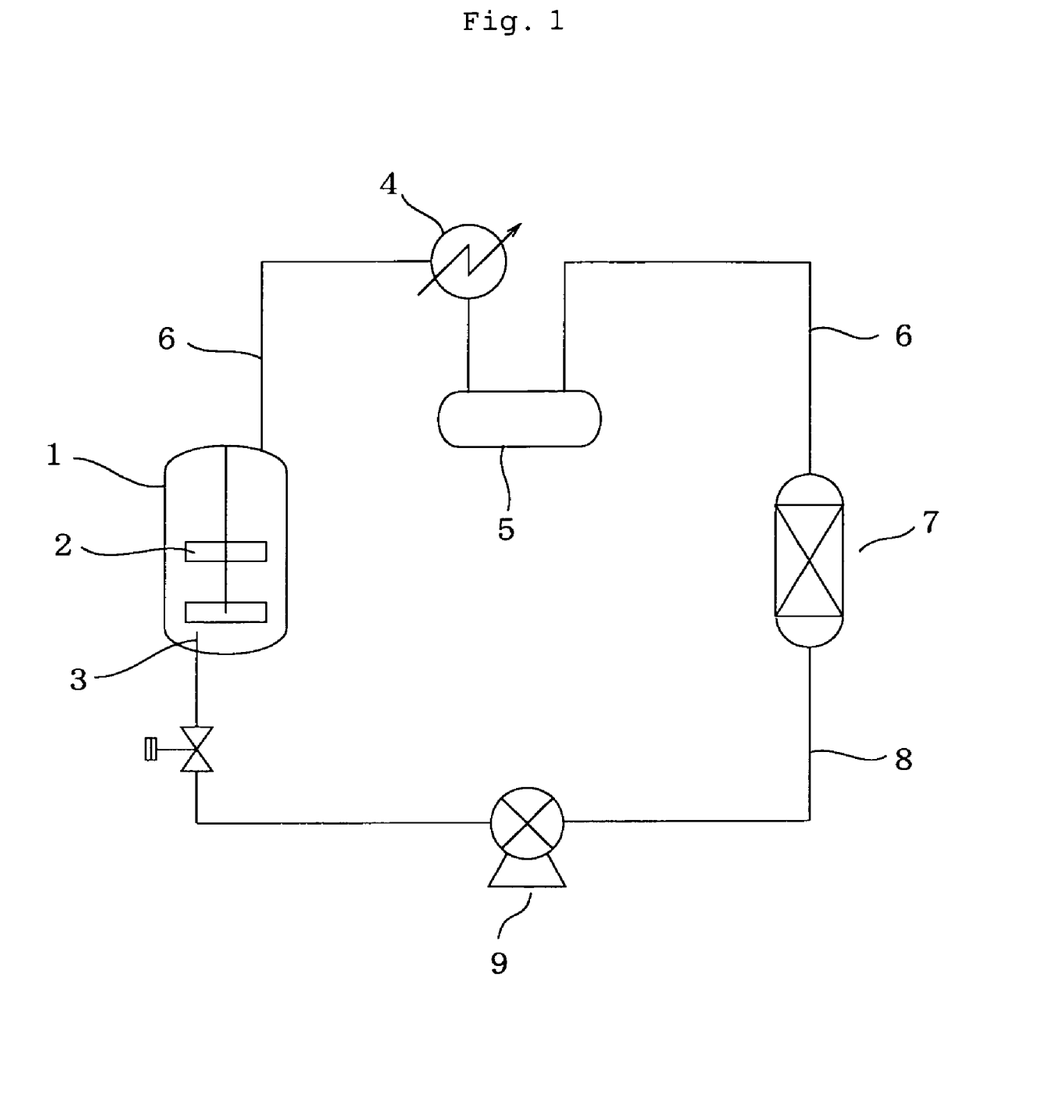
FIG. 1 illustrates an example of an apparatus used to carry out the process according to the present invention.

FIG. 1 illustrates an example of an apparatus used to carry out the stripping process according to the present invention. This stripping apparatus comprises an evaporator 1, a stirrer 2, a gas blowing pipe 3, a condenser 4, a condensation tank 5, an apparatus 7 for removing volatile substances from the stripped gas mixture and a blower 9. Gas lines 6 and gas circulating lines 8 communicate with these members.

A dispersion comprising a polymer particles is supplied to the evaporator 1, and then, while the dispersion is stirred with a stirrer, the blower 9 is activated to blow an inert gas such as nitrogen gas into the dispersion from the gas blowing pipe 3. The gas source is not shown in the diagram. Volatile substances contained in the dispersion are drawn into the inert gas, stripped and fed out of the system. The gas mixture of the inert gas and the stripped volatile substances is fed via a line 6 to the condenser 4 and condensation tank 5, where mainly water as the dispersion medium is condensed. Next, the gas mixture is fed to the volatility removing apparatus 7 where volatile substances such as unreacted polymerizable monomers are removed. The purified gas constituent obtained by removing the volatile substances from the gas mixture is fed into the blower 9 from the gas circulation line 8 and blown from the gas blowing pipe 3 into the dispersion. This stripping is generally carried out until the dispersion, and moreover, the amount of volatile substances such as unreacted polymerizable monomers contained in the polymer particles is reduced to a desired level.

Figure 2:
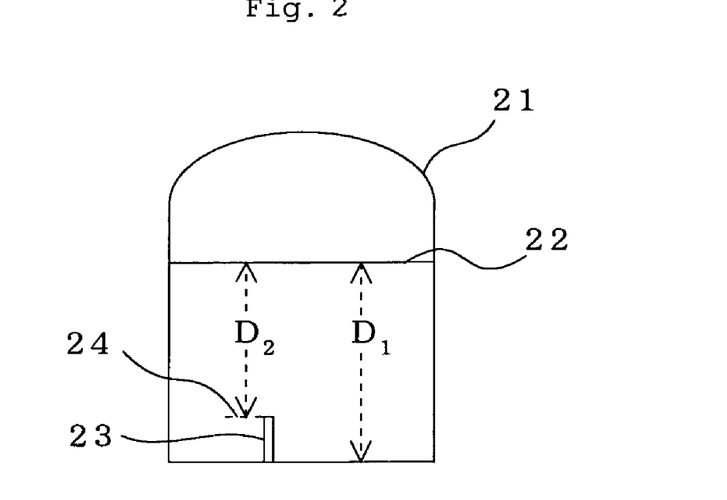
FIG. 2 illustrates a measurement example of the maximum liquid depth $D_1$ of the dispersion comprising the polymer particles and of the liquid depth $D_2$ to the inert gas blowing position.

FIG. 2 illustrates a measurement example of the maximum liquid depth $D_1$ of the dispersion comprising the polymer particles and the liquid depth $D_2$ to an inert gas blowing position. A dispersion comprising a polymer particles is supplied into an evaporator 21, wherein the depth from a still liquid surface 22 to the bottom of the inside of the evaporator 21 is taken as the maximum depth $D_1$ of the dispersion comprising the polymer particles. An inert gas blowing pipe 23 is disposed on the bottom inside the evaporator 21, whereby inert gas is blown into the dispersion from an inert gas blowing position 24. The depth from the still liquid surface 22 of the dispersion to the inert gas blowing position is taken to be the inert gas blowing position depth $D_2$.

In the stripping process according to the present invention, when blowing an inert gas, stripping is desirably carried out with the inert gas blowing position 24 set to have a ratio $D_2/D_1$ in the range of preferably 0.5 to 1, more preferably 0.75 to 1, where $D_1$ is the maximum depth of the dispersion comprising the polymer particles and $D_2$ is the depth to the inert gas blowing position.

When the above ratio $D_2/D_1$ is less than 0.5, the contact time between the blown inert gas and the dispersion comprising the polymer particles becomes short, thereby decreasing the removal efficiency of the volatile substances in the polymer particles. In the production process according to the present invention, the inert gas blowing position is the blowing aperture position of the gas blowing pipe or the gas dispersion plate.

In the stripping process according to the present invention, it is preferable to blow the inert gas while stirring the dispersion comprising the polymer particles with a stirrer, as this allows for efficient stripping of volatile substances from the dispersion comprising the polymer particles. The stirrer applicable to the stripping process according to the present invention can be a stirrer which is generally used in a chemical reaction apparatus. Specifically, it may be a flat paddle stirrer, a sloped paddle stirrer, a half paddle stirrer, a propeller stirrer, an anchor stirrer, Pfaudler stirrer, a turbine stirrer, Brumargin stirrer, Maxblend stirrer (manufactured by Sumitomo Heavy Industries, Ltd.), Full Zone stirrer (manufactured by Shinko Pantec Co., Ltd.), a ribbon stirrer, Super Mix stirrer (manufactured by Satake Chemical Equipment Mfg., Ltd.), A310 stirrer (manufactured by Lightin), A320 stirrer (manufactured by Lightin) and Intermig stirrer (manufactured by Eckerd Co., Ltd.).

Figure 3:
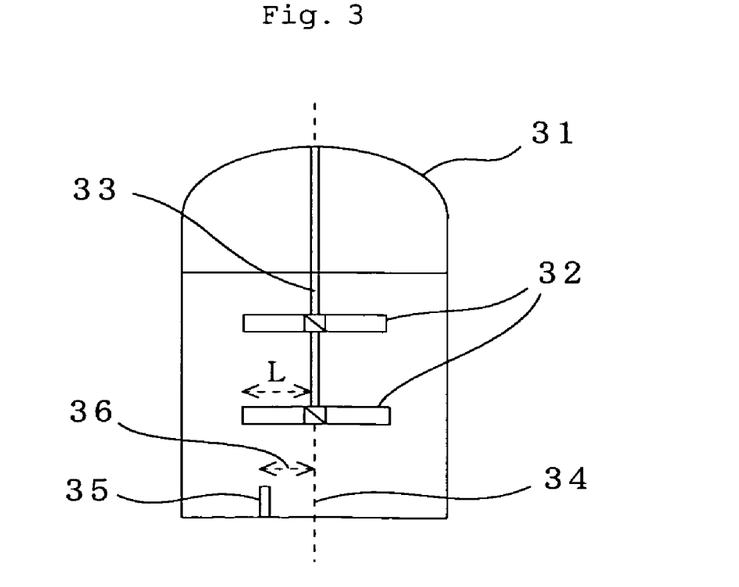
FIG. 3 illustrates a measurement example of a length L in a horizontal direction from the center-axis of a stirrer to the tip of the stirrer.

FIG. 3 illustrates a measurement example of a length L in a horizontal direction from the center-axis of the stirrer to the tip of the stirrer. A stirring apparatus is arranged in the evaporator 31. This stirring apparatus is configured such that two stirrer 32, 32 are attached to the stirrer axis 33. "L" is the horizontal distance from the center-axis 34 of the stirrer axis of the stirrer 32 to a tip of the stirrer. An inert gas blowing pipe 35 is arranged on the bottom of the inside of the evaporator 31, whereby inert gas is blown into the dispersion comprising the polymer particles from a blowing position 36 in a horizontal direction to the inert gas.

In the present invention stripping is performed while stirring a dispersion comprising a polymer particles with a stirrer. While this is being done it is preferable to set the inert gas blowing position to be a distance in the range of 0.05 L to 1.5 L from the center-axis, where L is the horizontal distance from the center-axis of the stirrer to a tip of the stirrer. It is more preferable to set this distance to be in the range of 0.2 L to 1.2 L. The inert gas blowing position is generally set below the stirrer. However, when there are multiple stirrers, the position is set be low the lowest stirrer. When the horizontal length of the stirrer is short and the inert gas blowing position is set outside of the stirrer, the inert gas blowing position does not have to be set below the stirrer.

When the inert gas blowing position in a horizontal direction is closer to the stirrer's center-axis than the above position, the contact time between the blown inert gas and the dispersion comprising the polymer particles is smaller. This tends to decrease the removal efficiency of the volatile substances in the dispersion. Further, when the inert gas blowing position in a horizontal direction is further away from the stirrer's center-axis than the above position, it becomes more difficult for the blown inert gas to disperse into the dispersion comprising the polymer particles, so that the removal efficiency of the volatile substances in the dispersion tends to decrease. When L has different values in a depth direction, the maximum value is taken as L.

In the stripping process according to the present invention, the gas temperature when blowing the inert gas is preferably less than 100° C. in terms of preventing agglomeration of the polymer particles. While the blowing amount of inert gas depends on factors such as the tank size (stripping apparatus) and amount of dispersion comprising polymer particles, it should be suitably adjusted within a range wherein the dispersion in the tank does not foam.

In the stripping process according to the present invention, it is preferable to blow the inert gas while heating the dispersion comprising the polymer particles, because the removal efficiency of the volatile substances in the polymer particles increases. Heating of the dispersion comprising the polymer particles is carried out so that the temperature $Ts(°C.)$ of the dispersion in the stripping apparatus is set to preferably $Tg \leq Ts < 100°$ C., more preferably $Tg \leq Ts < 90°$ C., and even more preferably $Tg+5°$ C.$\leq Ts < 85°$ C., where $Tg(°C.)$ is the glass transition temperature of the polymer particles. Where the Tg of the polymer particles has 2 or more points, the lowest glass transition temperature is used as the reference. Tg is a value measured by a differential scanning calorimeter (DSC). When the temperature $Ts(°C.)$ of the dispersion is too high, the dispersion stability of the polymer particles decreases due to the heat so that aggregates are formed, or the scale adhesion amount on the stripping apparatus increases On the other hand, if Ts is too low, the removal efficiency of volatile substances such as residual polymerizable monomers in the polymer particles decreases.

In the stripping method according to the present invention, volatile substances can be efficiently removed by supplying a dispersion comprising a polymer particles that has been preheated close to the treatment temperature to the stripping apparatus, then carrying out stripping. This heating temperature may be such that the temperature $Ts(°C.)$ of the dispersion in the stripping apparatus is in the above temperature range, i.e. preferably in the range of $Tg \leq Ts < 100°$ C., more preferably $Tg \leq Ts \leq 90°$ C., and even more preferably $Tg+5°$ C.$\leq Ts \leq 85°$ C.

In the stripping method according to the present invention, means for heating the dispersion comprising the polymer particles include, for example, a heating process in which a heat medium circulating jacket is disposed on the stripping apparatus, a heating process in which a heat exchanger is disposed in the stripping apparatus, a heating process in which a heat exchanger is connected from outside of the stripping apparatus and the like.

If heating is carried out by connecting a heat exchanger from outside, it is preferable to set the temperature of the heated dispersion comprising the polymer particles higher than the dispersion comprising the polymer particles in the stripping apparatus. Such temperature difference is preferably 5° C. or more to 50° C. or less, and more preferably 10° C. or more to 20° C. or less. When this temperature difference is too small the removal efficiency of the volatile substances decreases. While the type of this external heat exchanger is not particularly restricted, it is preferably a plate-type heat exchanger which has a large contact area in heating and can heat efficiently even if the heat medium temperature is low in order to suppress agglomeration due to heating of the dispersion comprising the polymer particles or instability when circulating.

In the stripping method according to the present invention, when performing stripping, it is preferable to repeatedly carry out an expelling operation (hereinafter referred to as "flashing") of at least a portion of the dispersion comprising the polymer particles from the top part of the stripping apparatus to the lower part, since evaporation of the volatile substances can be carried out efficiently. While flashing can be carried out by repeatedly first directly incorporating the dispersion into an external apparatus then returning the dispersion from the external apparatus into the stripping apparatus by flashing, it is preferable to repeat the operation of incorporating a portion of the dispersion into an external apparatus then returning the dispersion from the external apparatus into the stripping apparatus by flashing after first putting the dispersion into the stripping apparatus.

In the stripping process according to the present invention, stripping can be carried out at normal or low pressure, although normal pressure is preferred as treatment can be carried out with stability. If stripping is carried out under low pressure, the dispersion comprising the polymer particles may foam, making stable treatment difficult. Therefore, when carrying out stripping treatment under low pressure, it is desirable to employ a pressure such that the dispersion comprising the polymer particles does not foam. Although normal pressure means a standard atmospheric pressure (about 101 kPa), here it shall include a range around that pressure (for example 101±5 kPa) to the extent that the pressure does not greatly exceed such standard atmospheric pressure.

In the stripping process according to the present invention, because volatile substances are stripped from the dispersion comprising the polymer particles by blowing an inert gas into the dispersion to draw the volatile substances into the inert gas, the stripped inert gas contains the drawn volatile substances. The present invention removes the volatile substances from the gas mixture of the inert gas and the stripped volatile substances, and circulates the purified inert gas obtained by removing the volatile substances from the gas mixture, as the gas used for stripping. That is, stripping of the volatile substances from a dispersion comprising a polymer particles is continued by blowing the purified inert gas into the dispersion comprising the polymer particles. Continuation of the stripping treatment by circulating an inert gas can be implemented using an essentially closed system. Of course, if the amount of inert gas becomes insufficient during stripping treatment, the pressure in the system can be adjusted by replenishing the inert gas from a gas source.

Methods for removing volatile substances from the stripped gas mixture which can be used in the stripping process according to the present invention include (i) a removing method which employs a bubbling apparatus using cold water or a condenser using chiller water cooling to condense the volatile substances; (ii) a removing method which fills a porous material in an adsorption tower to adsorb the volatile substance onto the porous material; and (iii) a removing method which agglomerates the volatile substances on a filter and the like.

When removing using a bubbling apparatus using cold water or a condenser using chiller water cooling to condense the volatile substances, the cold water or, the chiller water temperature may be in the range where the volatile substances do not freeze, although in terms of the removing efficiency of the volatile substances a range of 0 to 10° C. is preferable.

When removing by filling a porous material in an adsorption tower to adsorb the volatile substance onto the porous material, porous materials that may be used specifically include activated carbon, silica gel and synthetic zeolite, among which active carbon is preferable because of its high adsorption capacity. The shape, particle diameter and pore size of the porous material can be selected as appropriate. The filling ratio of the porous material into the adsorption tower can be selected as appropriate in accordance with the flow amount and pressure of the inert gas.

When removing by agglomerating the volatile substances on a filter, filters for removing natural gas, hydrogen gas or oil or water content from the air may be used as the filter.

Taking the concentration of volatile substances in the gas mixture as A, and the concentration of volatile substances in the purified inert gas obtained by removing the volatile substances from the gas mixture as B, the stripping process according to the present invention preferably removes the volatile substances from the gas mixture of the inert gas and the stripped volatile substances such that the gas regeneration ratio, expressed by $[(A-B)/A]\times 100$, is within the range of 30 to 100%. It is more preferable to remove the volatile substances from the gas mixture such that this gas regeneration ratio is within the range of 50 to 100%. If the gas regeneration ratio is too low, it becomes difficult to sufficiently increase the removing rate of the volatile substances from the dispersion comprising the polymer particles or the polymer particles.

In the stripping process according to the present invention, the stripping process is preferably continued until the residual polymerizable monomer concentration in the polymer particles, when it is gotten in from the dispersion comprising the polymer particles and dried after completion of the stripping, becomes preferably 80 ppm or less, more preferably 70 ppm or less, and even more preferably 50 ppm or less. To achieve this, the amount of the residual polymerizable monomer in the polymer particles, after completion of the stripping treatment of the volatile substances but before washing and drying, is preferably controlled to be 100 ppm or less.

The dispersion comprising the polymer particles stripped of volatile substances according to the stripping process of the present invention has the dispersion medium removed by washing, dewatering and drying, whereby the polymer particles are gotten in.

The dispersion comprising the polymer particles used in the stripping process according to the present invention is obtained by polymerizing, in an aqueous medium, a polymerizable monomer or a polymerizable monomer composition comprising a polymerizable monomer. Aqueous medium polymerization methods include suspension polymerization, emulsion polymerization, dispersion polymerization and the like, wherein after polymerizing purified polymer particles can be agglomerated if necessary.

While application of the stripping process according to the present invention is not particularly restricted as long as it is a dispersion comprising a polymer particles obtained by polymerizing in an aqueous medium, it may preferably be applied to a dispersion comprising a colored polymer particles obtained by polymerizing, in an aqueous medium, a polymerizable monomer composition comprising a polymerizable monomer and a colorant. The stripping process according to the present invention will be explained using the example of a dispersion comprising a colored polymer particles being used.

Polymerizable monomers that can be used in the stripping process according to the present invention include monovinyl based monomers, crosslinkable monomers, macromonomers and the like. The polymerized polymerizable monomer becomes a binder resin constituent in the polymer particles.

Specific examples of the monovinyl based monomer include styrene based monomers such as styrene, 4-methylstryrene and α-methylstyrene; unsaturated carboxylic acid monomers such as acrylic acid and methacrylic acid; unsaturated carboxylic acid ester monomers such as methyl acrylate, ethyl acrylate, propyl acrylate, butyl acrylate, 2-ethylhexyl acrylate, cyclohexyl acrylate, isobonyl acrylate, cyclohexyl methacrylate, isobonyl methacrylate, dimethylaminoethyl acrylate, methyl methacrylate, ethyl methacrylate, propyl methacrylate, butyl methacrylate, 2-ethylhexyl methacrylate, dimethyl aminoethyl methacrylate; unsaturated carboxycylic acid derivatives such as acrylamide and methacrylamide; ethylenically unsaturated monoolefins such as ethylene, propylene and butylene; vinyl esters such as vinyl acetate and vinyl propionate; vinyl ethers such as vinyl methyl ether and vinyl ethyl ether; vinyl ketone based monomers such as vinyl methyl ketone and methyl isopropenyl ketone; and nitrogen vinyl monomers such as 2-vinylpyridine, 4-vinylpyridine and N-vinylpyrrolidone.

These monovinyl based monomers may be used either singly or in any combination thereof. Among the monovinyl based monomers, the styrene based monomers and the combination of the styrene based monomers with the acrylic acid or derivatives of methacrylic acid are preferably used.

If these monovinyl based monomers are used in combination with a crosslinkable monomer, fixation properties, and in particular offsetting characteristics, improves. Crosslinkable monomers include, for example, aromatic divinyl compounds such as divinylbenzene, divinylnaphthalene and derivatives thereof; polyfunctional ethylenically unsaturated carboxylic acid esters such as ethylene glycol dimethacrylate and diethylene glycol dimethacrylate; N,N-divinylaniline and divinyl ether; and compounds having 3 or more vinyl groups. These crosslinkable monomers may be used either singly or in a combination of 2 or more thereof. The crosslinkable monomers in the present invention are used in a proportion of generally 0.05 to 5 parts by weight, preferably 0.1 to 2 parts by weight per 100 parts by weight of the monovinyl based monomer.

The macromonomer has a vinyl polymerizable functional group at its molecular chain terminal, and is an oligomer or polymer having a number average molecular weight of generally 1,000 to 30,000. The vinyl polymerizable functional group may be an acryloyl group, a methacryloyl group and the like, and in terms of ease of copolymerizing, a methacryloyl group is preferred. The amount of the macromonomer used is generally 0.01 to 10 parts by weight, preferably 0.03 to 5 parts by weight, and more preferably 0.05 to 1 part by weight per 100 parts by weight of the polymerizable monomer. The macromonomer is preferably used in this range, as a good balance between shelf stability and fixation properties can be achieved.

Black colorants or coloring colorants can be used as the colorant. Examples of black colorants include dyes and pigments such as carbon black and Nigrosine Base; and magnetic particles such as cobalt, nickel, triirontetroxide, manganese iron oxide, zinc iron oxide and nickel iron oxide. When carbon black is used, it preferably has a primary particle diameter of 20 to 40 nm. If the primary particle diameter of the carbon black is less than 20 nm, dispersion ability is decreased, so that the toner tends to cause a lot of fog. If the primary particle diameter of the carbon black is more than 40 nm, the amount of polyvalent aromatic hydrocarbon compounds increases, which tends to cause environmental safety problems.

To obtain a full color toner, generally, yellow colorants, magenta colorants and cyan colorants are used.

Yellow colorants use compounds such as azo-based pigments and fused polycyclic pigments. Specific examples include C. I. Pigment Yellow 3, 12, 13, 14, 15, 17, 62, 65, 73, 83, 90, 93, 97, 120, 138, 155, 180, 181, 185 and 186.

Magenta colorants use compounds such as azo-based pigments and fused polycyclic pigments. Specific examples include C.I. Pigment Red 48, 57, 58, 60, 63, 64, 68, 81, 83, 87, 88, 89, 90, 112, 114, 122, 123, 144, 146, 149, 163, 170, 184, 185, 187, 202, 206, 207, 209 and 251; and C.I. Pigment Violet 19.

Cyan colorants use compounds such as copper phthalocyanine compounds and derivatives thereof, and anthraquinone. Specific examples include C.I. Pigment Blue 2, 3, 6, 15, 15:1, 15:2, 15:3, 15:4, 16, 17 and 60.

The colorants are used in a proportion of, generally, 1 to 10 parts by weight per 100 parts by weight of polymerizable monomer.

The polymerizable monomer composition can also contain additives such as a charge control agent, a separating agent and a molecular weight modifier in addition to a polymerizable monomer and a colorant.

Specific examples of the charge control agent include commercially available charge control agents such as Bontron N-01 (manufactured by Orient Chemical Industries Ltd.), Nigrosine Base EX (manufactured by Orient Chemical Industries Ltd.), Spiron Black TRH (manufactured by Hodogaya Chemical Co., Ltd.), T-77 (manufactured by Hodogaya Chemical Co., Ltd.), Bontron S-34 (manufactured by Orient Chemical Industries Ltd.), BontronE-81 (manufactured by Orient Chemical Industries Ltd.), Bontron E-84 (manufactured by Orient Chemical Industries Ltd.), COPY CHARGE NX (manufactured by Clariant Co.) and COPY CHARGE NEG (manufactured by Clariant Co.).

In addition, charge control agents can also include, charge control resins such as quaternary ammonium (salt) group-containing copolymers as described in Japanese Patent Application Laid-Open Nos. 11-15192, 3-175456 and 3-243954, etc., and sulfonate (salt) group-containing copolymers described in Japanese Patent Application Laid-Open Nos. 3-243954, 1-217464 and 3-15858, etc.

To improve toner charge it is preferable to include these control agents in the colored polymer particles. Among these agents, charge control resins are preferable as they have high phase-solubility with binder resins, are colorless and can give stable charge control even for high-speed color continuous printing. The charge control agent is used in a proportion of generally 0.01 to 10 parts by weight, and preferably 0.1 to 7 parts by weight per 100 parts by weight of the polymerizable monomer.

Examples of the releasing agents include low molecular weight polyolefin waxes such as low molecular weight polyethylene, low molecular weight polypropylene and low molecular weight polybutylene; vegetable natural waxes such as candelilla wax, carnauba wax, rice wax, Japan wax and jojoba wax; petroleum waxes such as paraffin wax, microcrystalline wax and petrolatum; synthetic waxes such as Fischer-Tropsch wax; and polyfunctional ester compounds such as pentaerythritol tetramyristate, pentaerythritol tetrapalmitate and dipentaerythritol hexamyristate. The releasing agents may be used either singly or in a combination of 2 or more thereof. The releasing agents are used in a proportion of generally 0.1 to 20 parts by weight, preferably 1 to 10 parts by weight per 100 parts by weight of the polymerizable monomer.

Examples of the molecular weight modifier include mercaptans such as t-dodecylmercaptan, n-dodecylmercaptan and n-octylmercaptan; and halogenated hydrocarbons such as carbon tetrachloride and carbon tetrabromide. These molecular weight modifiers may be added to the reaction system before the initiation of the polymerization or in the course of the polymerization. The molecular weight modifier is used in a proportion of generally 0.01 to 10 parts by weight, and preferably 0.1 to 5 parts by weight per 100 parts by weight of the polymerizable monomer.

Any of the methods such as suspension polymerization, emulsion polymerization and dispersion polymerization may be employed as the polymerizing method for the polymerizable monomer composition. For example, a polymerizable monomer composition comprising a polymerizable monomer and additives such as a colorant, a charge control agent, a molecular weight modifier and a releasing agent is poured into an aqueous medium and stirred to form droplet particles, then the temperature is raised for polymerizing while stirring, if necessary in the presence of a polymerization initiator. Once that is completed, if necessary, an agglomeration method can be performed. The aqueous medium may contain a dispersion stabilizer.

Examples of the dispersion stabilizer include sulfates such as barium sulfate and calcium sulfate; carbonates such as barium carbonate, calcium carbonate and magnesium carbonate; phosphates such as calcium phosphate; metal oxides such as aluminum oxide and titanium oxide; and metal hydroxides such as aluminum hydroxide, magnesium hydroxide and ferric hydroxide. Further examples of the dispersion stabilizer include water-soluble polymers such as polyvinyl alcohol, methyl cellulose and gelatin; and surfactants such as anionic surfactants, nonionic surfactants and amphoteric surfactants.

Among these, metallic compounds are preferable as a dispersion stabilizer, and among the metallic compounds, colloids of hardly water-soluble metallic compounds are even more preferred as they are able to narrow the particle diameter distribution of the polymer particles which can increase the sharpness of an image. The hardly water-soluble metallic compounds colloids also provide dispersion stability to the polymer particles while stripping of the volatile substances is being carried out, and improve shelf stability and fixation properties of the toner.

The hardly water-soluble metal hydroxide colloid is not limited in its production process. However, it is preferable to use the colloid of a hardly water-soluble metal hydroxide obtained by adjusting the pH of an aqueous solution of a water-soluble polyvalent metallic compound to 7 or higher. It is particularly preferable to use a colloid of a hardly water-soluble metal hydroxide formed by reacting a water-soluble polyvalent metallic compound with an alkali metal hydroxide in an aqueous phase. The reaction rate of the water-soluble polyvalent metallic compound with the alkali metal hydroxide is preferably in the range of $0.4 \leq A \leq 1.0$, where A is the chemical equivalent ratio of the alkali metal hydroxide with respect to the water-soluble polyvalent metallic salt.

The colloid of the hardly water-soluble metal hydroxide preferably has a number particle diameter distribution, D50 (50% cumulative value of number particle diameter distribution) of 0.5 μm or less and D90 (90% cumulative value of number particle diameter distribution) of 1 μm or less. If the particle diameter of the colloid is too great, the stability of the polymerization reaction system is easily broken, and shelf stability of the resulting toner is also deteriorated.

The dispersion stabilizer is used in a proportion of generally 0.1 to 20 parts by weight, preferably 0.3 to 10 parts by weight per 100 parts by weight of the polymerizable monomer. If the proportion of the dispersion stabilizer used is too low, it is difficult to achieve sufficient polymerization stability and dispersion stability during the stripping, so that polymer aggregates are liable to form. If the proportion of the dispersion stabilizer used is too high on the other hand, the polymer particles become too fine, which is not desirable.

The aqueous medium can also contain water-soluble organic or inorganic compounds in addition to the dispersion stabilizer. Among such compounds, water-soluble oxo acid salts are preferable. Examples of such oxo acid salts include borate, phosphate, sulfate, carbonate, silicate and nitrate. Among these, silicate, borate and phosphate are preferable, and borate is particularly preferable. Examples of borate include sodium tetrahydroborate, potassium tetrahydroborate, sodium tetraborate, potassium tetraborate, sodium metaborate, sodium peroxyborate, potassium metaborate, potassium tetraborate and the respective hydrates thereof.

Phosphate examples include sodium phosphinate, sodium hydrogen phosphonate, sodium phosphate, disodium hydrogenphosphate, sodium dihydrogenphosphate, hexasodium metaphosphate, sodium hypophosphate, sodium diphosphate, disodium dihydrogendiphosphate, sodium dihydrogendiphosphate, sodium triphosphate, sodium cyclo-tetraphosphate, potassium phosphinate, potassium phosphonate, potassium hydrogen phosphonate, potassium phosphate, dipotassium hydrogen phosphate, potassium dihydrogen phosphate, potassium diphosphate, potassium metaphosphate and the respective hydrates thereof.

Examples of the silicate include sodium metasilicate, water glass and sodium orthosilicate.

The water-soluble oxo acid salt is used in a proportion of generally 0.1 to 1000 parts by weight, and preferably 1 to 100 parts by weight per 100 parts by weight of the dispersion stabilizer. The water soluble oxo acid salt is solved in water and contained in the aqueous medium.

Examples of the polymerization initiator include persulfates such as potassium persulfate and ammonium persulfate; azo compounds such as 4,4'-azobis (4-cyanovaleric acid), 2,2'-azobis [2-methyl-N-(2-hydroxyethyl)propionamide], and 2,2'-azobisisobutyronitrile; and peroxides such as methylethyl peroxide, acetyl peroxide, lauroyl peroxide, benzoyl peroxide, t-butylperoxy-2-ethyl hexanoate, t-butylperoxy neodecanoate and t-butylperoxy pivalate. The polymerization initiator is used in a proportion of generally 0.1 to 20 parts by weight, and preferably 0.3 to 15 parts by weight per 100 parts by weight of the polymerizable monomer.

Polymerizing the polymerizable monomer may be carried out in one stage, or can be split into two stages. Examples of two-stage methods include (i) a method which changes the composition of the monomer that is polymerized between the first stage (polymerizable monomer for core) and the second stage (polymerizable monomer for shell), wherein a core having a low glass transition temperature Tg is formed in the first stage polymerization, and a layer (shell) having a high Tg is formed in the second stage polymerization; and (ii) a method which first forms polymer particles by polymerizing a monomer in the first stage, the adds an arbitrary polymer constituent to adsorb or fix the polymer constituent to the particles. According to these methods, core-shell structure polymer particles can be produced.

The toner production process according to the present invention is a production process for a toner (polymerized toner) comprising colored polymer particles which includes the first step for generating colored polymer particles by polymerizing, in an aqueous medium, a polymerizable monomer composition comprising a polymerizable monomer and a colorant; the second step for stripping treatment of a dispersion comprising the colored polymer particles; and the third step for getting in the colored polymer particles from the dispersion after completion of the stripping treatment.

In the toner production process according to the present invention, once the first step is completed, the above stripping process is provided in the second step. Specifically, a process which continuously strips the volatile substances from the dispersion comprising the colored polymer particles is employed, which blows an inert gas into the dispersion comprising the colored polymer particles to draw the volatile substances into the inert gas, thereby stripping the volatile substances from the dispersion comprising the colored polymer particles. The volatile substances are then removed from the gas mixture of the inert gas and the stripped volatile substances, and the purified inert gas obtained by removing the volatile substances from the gas mixture, is circulated and blowing back into the dispersion comprising the colored polymer particles.

In the toner production process according to the present invention, in the course of stripping the volatile substances from the dispersion comprising the colored polymer particles, the method for blowing the inert gas into the dispersion and the method for removing the volatile substances from the stripped gas mixture and the like can be performed in the same manner as that described for the stripping method of the present invention.

Dispersions comprising colored polymer particles that can be used in the toner production process according to the present invention can be obtained by polymerizing, in an aqueous medium, a polymerizable monomer composition comprising a polymerizable monomer and a colorant. Examples include the same as those of the production process of the dispersion comprising the colored polymer particles which are preferably used in the stripping process according to the present invention. Specifically, suspension polymerizing, emulsion polymerizing or dispersion polymerizing, in an aqueous medium, a polymerizable monomer composition comprising a polymerizable monomer and a colorant, and if necessary, agglomerating. Among these polymerization methods, suspension polymerization is preferable, whereby a suspension polymerization toner can be obtained.

To obtain core-shell structure colored polymer particles (polymerization toner), during the first step, after the colored polymer particles are generated by polymerizing, in an aqueous medium, a polymerizable monomer composition comprising a polymerizable monomer and a colorant, a polymerizing step is added which polymerizes the polymerizable monomer for shell in the presence of the colored polymer particles to generate core-shell structure colored polymer particles.

After the stripping treatment of the second step is completed, post treatment is carried out on the dispersion comprising the colored polymer particles such as washing, dewatering and drying. In the later third step, the dispersion medium is removed, wherein the dried colored polymer particles are gotten in. These colored polymer particles are classified if necessary. When the colored polymer particles are to be used for a toner, generally an external additive is added and adhered to the surface of the colored polymer particles.

External additives include inorganic fine particles and organic resin particles. Examples of inorganic fine particles include silicon dioxide, aluminum oxide, titanium oxide and the like. Examples of organic resin particles include methacrylic ester polymers, styrene-methacrylic ester copolymers and core-shell structure polymer particles in which the core is composed of a styrene polymer, and the shell is composed of a methacrylic ester copolymer. Among these, the particles of the inorganic oxides are preferred, silica dioxide particles are more preferred and hydrophobicity-imparted silica dioxide particles are still more preferred.

The amount of the external additives added is generally 0.1 to 6 parts by weight per 100 parts by weight of the colored polymer particles. Two or more of the external additives may be used in combination. When the external additives are used in combination, it is preferable to use two kinds of inorganic oxide particles or organic resin particles, which are different in average particle diameter from each other, in combination. The adhesion of the external additives to the toner particles is generally conducted by putting the external additives and the colored polymer particles into a mixer such as a Henschel mixer to mix them while stirring.

The toner obtained according to the production process of the present invention has a volume average particle diameter (Dv) of generally 0.5 to 20 μm, preferably 1 to 10 μm, and more preferably 2 to 8 μm. If the particle diameter is large, resolution tends to decrease.

While the toner obtained according to the production process of the present invention is suitable as a one-component developer, it may also be used in combination with a carrier as a two-component developer.

EXAMPLES

Hereinafter the present invention will be explained in further detail using examples. However the present invention is not only restricted to these examples. Unless otherwise stated, "part" and "%" are by weight. The evaluation method is as follows.

(1) Particle Diameter

Volume average particle diameter (Dv) and Particle diameter distribution represented by a ratio (Dv/Dp) of the volume average particle diameter (Dv) to the number average particle diameter (Dp) of the polymer particle were measured using a Multisizer (manufactured by Beckman Coulter Co.). Measurements using this Multisizer were conducted under conditions of aperture diameter =100 μm, medium=Isothone II, concentration=10% and the number of particles measured=100,000 particles.

(2) Volatile Substance Removal Rate

The volatile substance removal rate is a value expressing the amount of volatile substances removed per unit time taking the amount of volatile substances prior to treatment as a reference. The volatile substance removal rate was found using the following procedure.

First, the amount of volatile substances was measured by gas chromatography in accordance with the following conditions and methods.

Column: TC-WAX (0.25 mm×30 m)

Column temperature: 80° C.

Injection temperature: 200° C.

FID detection side temperature: 200° C.

Stripping was performed on polymer particles or volatile substances not yet stripped of their volatile substances, then 3 g of washed and dried polymer particles was precisely weighed in 1 mg units. Next, 27 g of N,N-dimethylformamide was added to the polymer particles and stirred for 15 minutes. After this, 13 g of methanol was added, wherein the mixture was stirred for a further 10 minutes, then left to rest to precipitate insoluble matter. A supernatant liquid was then taken as a test sample, where 2 μl of the test sample was poured into a gas chromatograph for measuring the amount of volatile substances. An N,N-dimethylformamide/methanol solution of each monomer was used as a standard sample for measurement.

Polymer particles before they are stripped of volatile substances are wet, so that the amount of volatile substances in polymer particles not yet stripped of their volatile substances was calculated as a ratio to pure solids of the wet polymer particles. The calculated pure solids ratio was found by multiplying the amount of volatile substances in the wet polymer particles.

The pure solids content was found by the following procedure. (i) A dispersion comprising a polymer particles that was yet to undergo stripping treatment was divided up, (ii) the divided dispersions comprising the polymer particles were filtered to give wet polymer particles, (iii) the wet polymer particles were precisely weighed in 1 mg units, (iv) the wet polymer particles were dried for 1 hour at 105° C., and the weight of the solid content was precisely weighed, and (v) the pure solids content ratio in the wet polymer particles was calculated from the weight difference before and after drying.

Meanwhile, the amount of volatile substances in polymer particles that had been stripped of volatile substances, washed and dried was calculated as a ratio to the weight of polymer particles.

Using the above method, the amount of volatile substances stripped over time was measured, and plotted on a graph as treatment time (x) versus amount of volatile substances (y) The single logarithmic graph taking the log of y gave the index approximate equation $y=a \times e^{-bx}$, which was then used in the following equation to calculate the volatile substances reduction speed Rs (%/hr).

$$Rs=100 \times (1-e^{-b})$$

(3) Gas Regeneration Rate

A gas mixture yet to have volatile substances removed, and a inert gas which had volatile substances removed from the gas mixture were each blown into N,N-dimethylformamide which was cooled to −30° C. to −50° C., wherein the volatile substances were made to dissolve into the N,N-dimethylformamide. The N,N-dimethylformamides (DMF) into which the volatile substances had been dissolved were measured using gas chromatography, wherein their peak surface areas were compared with that of a standard sample (a DMF solution having the concentration of a known polymerizable monomer; in the present example styrene) whereby the amount of volatile substances in the gas was determined. The gas regeneration rate was calculated using the below equation, in which A is the amount (ppm) of volatile substances in the gas mixture prior to removing the volatile substances, and B is the amount (ppm) of volatile substances in the inert gas after removal of its volatile substances.

Gas regeneration rate(%)=$(A-B)/A \times 100$)

(4) Liquid Surface Foaminess

The liquid surface of the dispersions comprising the polymer particles during stripping treatment was visually observed for evaluation using the following standards.

A: Bubble retention on the liquid surface of the dispersion is hardly observed, or the liquid surface is stable having only a small foam layer formed thereon.

B: Bubble retention on the liquid surface of the dispersion is continuously observed, but the bubbles are in an unstable state moving in a range such that their forefront does not reach the exhaust nozzle on an upper portion of the stripping apparatus.

C: Bubbles grow so that their forefront reaches as far as the exhaust nozzle of an upper portion of the evaporator. The insides of the system are unstable, making continuous treatment impossible.

(5) Odor Evaluation:

During printing by a commercially available non-magnetic one-component development system (manufactured by Oki Data; model name MICROLINE 12n), monomer odor in the vicinity of the printed paper exit was sensorially evaluated by five healthy adults. The sensory evaluation results were determined on the basis of the following standards.

A: None of the five people smelt a bad odor.
B: A bad monomer odor was smelt by 1 or 2 people.
C: A bad monomer odor was smelt by more than 3 people.

Example 1

1. Polymerized Toner Preparation Process

A polymerizable monomer mixture (Tg of the copolymer obtained by copolymerizing these monomers=55° C.) for a core composed of 80.5 parts of styrene and 19.5 parts of n-butyl acrylate, 0.3 parts of a polymethacrylic ester macromonomer ("AA6", trade name; Tg: 94° C.; manufactured by Toagosei Chemical Industry Co., Ltd.), 0.5 parts of divinylbenzene, 1.2 parts of t-dodecylmercaptan, 7 parts of carbon black ("#25", trade name; manufactured by Mitsubishi Kagaku Co., Ltd.), 1 part of a charge control agent ("Spiron Black TRH", trade name; manufactured by Hodogaya Chemical Co., Ltd.) and 2 parts of a releasing agent ("Paraflint spray 30", trade name; Fischer-Tropsch wax manufactured by Sasol, Ltd.; endothermic peak temperature=100° C.) were subjected to wet grinding by means of a media type wet grinding machine to prepare a polymerizable monomer composition for core.

Meanwhile, an aqueous solution with 5.0 parts of sodium hydroxide (alkali metal hydroxide) dissolved in 50 parts of ion-exchanged water was gradually added to an aqueous solution with 6.5 parts of magnesium chloride (water-soluble polyvalent metallic salt) dissolved in 200 parts of ion-exchanged water under stirring to prepare a dispersion of magnesium hydroxide colloid (a colloid of hardly water-soluble metallic hydroxide). The particle diameter distribution of the colloid formed was measured by means of a microtrack particle diameter distribution measuring device (manufactured by Nikkiso Co., Ltd.) and found to be 0.35 µm in terms of D50 (50% cumulative value of number particle diameter distribution) and 0.84 µm in terms of D90 (90% cumulative value of number particle diameter distribution). Measurement using the microtrack particle diameter distribution measuring device was performed under the following conditions:

Measuring range: 0.12 to 704 µm;
Measuring time: 30 seconds; and
Medium: ion-exchanged water.

Further, 3 parts of methyl methacrylate (Tg of the homopolymer=105° C.) and 100 parts of water were subjected to a fine dispersing treatment by an ultrasonic emulsifier to obtain an aqueous dispersion of a polymerizable monomer for shell. The particle diameter of droplets of the polymerizable monomer for shell in the dispersion had a D90 of 1.6 µm as measured using the microtrack particle diameter distribution measuring device by adding the droplets thus obtained at the concentration of 3% to a 1% aqueous solution of sodium hexametaphosphate.

The polymerizable monomer composition for core was poured into the dispersion comprising magnesium hydroxide obtained above, and stirred until the droplets became stable. After 6 parts of t-butyl peroxy-2-ethylhexanoate ("Perbutyl O", trade name, manufactured by Nippon Oil & Fats Co., Ltd.) was added as a polymerization initiator thereto, the resultant dispersion was stirred under high shearing force using a granulator, Ebara Milder (manufactured by Ebara Corporation) to form droplets of the monomer mixture. An aqueous dispersion containing the prepared droplets of the monomer mixture was put into a reactor equipped with a stirrer to initiate a polymerization reaction at 85° C. After the polymer conversion rate reached almost 100%, a solution into which 0.3 parts of a water-soluble initiator (2,2'-azobis(2-methyl-N-(2-hydroxyethyl)-propionamide); "VA-086", trade name; manufactured by Wako Pure Chemical Industries, Ltd.) had been dissolved into the aqueous dispersion of the above-prepared polymerizable monomer for shell was put into the reactor. After the polymerization was continued for 4 hours, the reaction was stopped by cooling to obtain an aqueous dispersion comprising a colored polymer particles. At this time, the solid content concentration of the dispersion comprising colored the polymer particles was 27%. Here, the amount of residual styrene in the colored polymer particles where the volatile substances not yet removed was measured.

2. Stripping Treatment Process

An apparatus as shown in FIG. 1 was used as the apparatus for stripping volatile substances from a dispersion comprising a colored polymer particles. An adsorbing tower (Ratio of the adsorption tower height H and diameter D H/D=30.8) filled with 20 parts of activated carbon (Trade name: Particulate White Heron G2X; 4-6 Mesh cast) was used for the volatile substance removing apparatus 7 in the gas mixture.

After diluting the dispersion comprising the colored polymer particles with ion-exchanged water to a solid content concentration of 20%, the dispersion was supplied to an evaporator 1. Nitrogen gas was then passed into the system to replace the gas phase in the system with nitrogen gas. While stirring the dispersion comprising the colored polymer particles with a stirrer 2, heat was applied until the temperature reached 80° C. Once that had happened, a blower 9 was activated for adjusting the flow rate of nitrogen gas to 0.3 m³/(hr×kg), wherein the gas blowing aperture blew nitrogen gas into the dispersion comprising the colored polymer particles from a straight-pipe shaped blowing pipe 3 to strip volatile substances from the dispersion comprising the colored polymer particles. In this process the nitrogen gas flow rate was the flow rate per 1 kg of solid content of the dispersion.

At this time, the ratio $D_2/D_1$ was 0.82, where $D_1$ was the maximum liquid depth of the dispersion comprising the colored polymer particles and $D_2$ the liquid depth to the nitrogen gas blowing position. The blowing position in a horizontal position of the nitrogen gas was made to be 0.81 L of the horizontal position from the center-axis of the stirrer axis.

Stripped nitrogen gas passed through a line 6 then a condenser 4 and condenser tank 5 to reach the removing apparatus 7. Volatile substances from the stripped nitrogen gas mixture were removed by the removing apparatus 7. Nitrogen gas which had volatile substances removed passed through circulating line 8, and was once more blown into the dispersion comprising the colored polymer particles from the gas blowing pipe 3.

This treatment was carried out for 10 hours at a pressure inside the evaporator of 101 kPa and a temperature of the dispersion comprising the colored polymer particles of approximately 80° C. During the stripping time samples were taken every 1 hour, wherein the residual styrene amount and the amount of other volatile substances were measured. At the same time, the gas regeneration rate was calculated from the residual styrene amount and the amount of other volatile substances in the inert gas before and after the removing apparatus 7. After treating for 10 hours the dispersion was cooled to 25° C.

3. Recovery Step

After the stripping process, the aqueous dispersion comprising a core-shell structure colored polymer particles was washed (at 25° C. for 10 minutes) with sulfuric acid while stirring to adjust the pH of the system to 4.5 or lower. This aqueous dispersion was then filtered, and dewatered using a continuous belt filter ("Eagle Filter" tradename, manufactured by Sumitomo Heavy Industries, Ltd.) and washed, and solid contents were then separated by filtration. The wet polymer particles were placed in a dryer to dry them at 45° C. for 10 hours to recover core-shell structure polymer particles. The residual styrene amount in the dried colored polymer particles was measured.

To 100 parts of the colored polymer particles were added 0.8 parts of silica ("RX200", trade name; manufactured by Nippon Aerosil Co., Ltd.) having an average particle diameter of 14 nm subjected to a hydrophobicity-imparting treatment, and they were mixed using a Henschel mixer to prepare an electrophotographic toner (non-magnetic one-component developer). The obtained toner was evaluated for odor. Results are shown in Table 1.

Example 2

Stripping treatment was carried out in the same manner as that in Example 1, except for using an adsorption tower filled with silica gel (manufactured by Fuji Silysia Chemical Ltd.; trade name: Fuji Silica Gel Type B; 5-10 Mesh) as the removing apparatus for the volatile substances in the gas mixture. Thereafter, an electrophotographic toner was prepared in the same manner as Example 1. Results are shown in Table 1.

Example 3

Stripping treatment was carried out in the same manner as that in Example 1, except for using an adsorption tower filled with synthetic zeolite (molecular sieve 3A) as the removing apparatus for the volatile substances in the inert gas. Thereafter, an electrophotographic toner was prepared in the same manner as Example 1. Results are shown in Table 1.

Example 4

Stripping treatment was carried out in the same manner as that in Example 1, except for removing the volatile substances in the gas mixture using a bubbling apparatus with cold water having a water temperature of 5° C. in place of the adsorption tower. Thereafter, an electrophotographic toner was prepared in the same manner as Example 1. Results are shown in Table 1.

Example 5

Stripping treatment was carried out in the same manner as that in Example 1, except for removing the volatile substances in the gas mixture using a condenser using chiller water having a water temperature of 5° C. in place of the adsorption tower. Thereafter, an electrophotographic toner was prepared in the same manner as Example 1. Results are shown in Table 1.

Comparative Example 1

Stripping treatment was carried out in the same manner as that in Example 1, except that nitrogen gas was not blown into the dispersion comprising the colored polymer particles, the pressure inside the evaporator was lowered to 40 kPa, and the temperature of the dispersion comprising the colored polymer particles was made to be 75° C. Thereafter, an electrophotographic toner was prepared in the same manner as Example 1. Results are shown in Table 1.

TABLE 1

|  | Example 1 | Example 2 | Example 3 | Example 4 | Example 5 | Comp. Ex. 1 |
|---|---|---|---|---|---|---|
| Polymer Particle Aqueous Dispersion Temperature (° C.) | 80 | 80 | 80 | 80 | 80 | 75 |
| Evaporator Internal Pressure (kPa) | 101 | 101 | 101 | 101 | 101 | 40 |
| Inert Gas Type | Nitrogen | Nitrogen | Nitrogen | Nitrogen | Nitrogen | None |
| Treatment Time (hr) | 10 | 10 | 10 | 10 | 10 | 10 |
| Nitrogen Amount (m³) | 40 | 40 | 40 | 40 | 40 | — |
| Means for Removing | Adsorption | Adsorption | Adsorption | Cold water | Condenser | None |

TABLE 1-continued

|  | Example 1 | Example 2 | Example 3 | Example 4 | Example 5 | Comp. Ex. 1 |
|---|---|---|---|---|---|---|
| Volatile Substances from the Gas Mixture | tower filled with activated carbon | tower filled with silica gel | tower filled with molecular sieve | bubbling apparatus (water temp. 5° C.) | using chiller water (water temp. 5° C.) |  |
| Gas Regeneration Rate (%) | 100 | 77 | 70 | 50 | 55 | — |
| Gas Blowing Position ($D_2/D_1$) | 0.82 | 0.82 | 0.82 | 0.82 | 0.82 | — |
| Liquid Surface Foaminess | A | A | A | A | A | C |
| Styrene Removal rate (%/hr) | 33 | 31 | 31 | 24 | 26 | 15 |
| Other Volatile Substances Removal rate (%/hr) | 13 | 11 | 9 | 9 | 10 | 5 |
| Residual Styrene Amount |  |  |  |  |  |  |
| Before Stripping (ppm) | 658 | 607 | 640 | 672 | 675 | 635 |
| After Stripping (ppm) | 12 | 15 | 16 | 42 | 33 | 125 |
| Odor Evaluation | A | A | A | A | A | B |

The following can be learnt from the results shown in Table 1. That is, as shown by the results of Examples 1 to 5, the stripping process according to the present invention can strip residual volatile substances such as polymerizable monomers from a dispersion comprising a polymer particles efficiently and with stability. Further, the toner production process according to the present invention can strip residual volatile substances such as polymerizable monomers from a dispersion comprising a colored polymer particles efficiently and with stability, and the obtained toner has a low odor when evaluated for toner odor.

In contrast, in Comparative Example 1, because stripping was carried out without blowing in nitrogen gas and under low pressure, foaming of the dispersion comprising the polymer particles occurs during treatment, thus making stable treatment impossible.

INDUSTRIAL APPLICABILITY

The stripping process according to the present invention can strip volatile substances from a dispersion comprising a polymer particles efficiently. The toner production process according to the present invention can strip volatile substances such as residual polymerizable monomers from a dispersion comprising colored polymer particle efficiently and with stability, and the obtained toner has a low odor when evaluated for toner odor. The process according to the present invention is excellent in energy conservation, improving productivity and environmental protection.

The invention claimed is:

1. A process for stripping volatile substances from a dispersion comprising polymer particles obtained by polymerization in an aqueous medium, the process comprising:
   (A) stripping volatile substances from the dispersion by blowing an inert gas into the dispersion to draw the volatile substances into the inert gas;
   (B) removing volatile substances from the gas mixture of the inert gas and the stripped volatile substances; and
   (C) continuing the stripping of the volatile substances from the dispersion by circulating a purified inert gas obtained by removing the volatile substances from the gas mixture, and blowing the purified inert gas into the dispersion;
   wherein an inert gas blowing position in stripping step (A) is set so that a ratio $D_2/D_1$ is in a range of 0.5 to 1, where $D_1$ is a maximum liquid depth of the dispersion and $D_2$ is a liquid depth to an inert gas blowing position, and
   wherein stripping is carried out while stirring the dispersion using a stirrer, and the inert gas blowing position is at a distance in a range of 0.05 L to 1.5 L from a center-axis of the stirrer, where L is a horizontal distance from the center-axis of the stirrer to a tip of the stirrer.

2. The process according to claim 1, wherein the dispersion comprises polymer particles obtained by polymerizing in an aqueous medium a polymerizable monomer or a polymerizable monomer composition comprising a polymerizable monomer.

3. The process according to claim 1, wherein the dispersion comprises colored polymer particles, obtained by polymerizing in an aqueous medium a polymerizable monomer composition comprising a polymerizable monomer and a colorant.

4. The process according to claim 1, wherein the dispersion comprises core-shell structure colored polymer particles obtained by
   generating colored polymer particles by polymerizing in an aqueous medium a polymerizable monomer composition comprising a polymerizable monomer and a colorant, then
   polymerizing a polymerizable monomer for shell in the presence of the colored polymer particles.

5. The process according to claim 1, wherein the inert gas is selected from a group consisting of nitrogen gas, dried air, carbon dioxide, a noble gas and a mixed gas of two or more thereof.

6. The process according to claim 1, wherein stripping is continued until a residual polymerizable monomer concentration in the polymer particles becomes 80 ppm or less.

7. The process according to claim 1, wherein stripping is carried out while heating the dispersion to a temperature in a range not lower than a glass transition temperature of the polymer particles and lower than 100° C., and blowing the inert gas therein.

8. The process according to claim 1, wherein the volatile substances are removed from the gas mixture of the inert gas and the stripped volatile substances by:

(1) a method which condenses the volatile substances in the gas mixture using a bubbling apparatus using cold water or a condenser using chilled water cooling;
(2) a method which adsorbs the volatile substances in the gas mixture on a porous material using an adsorption tower filled with a porous material;
(3) a method which agglomerates the volatile substances in the gas mixture using a filter; or
(4) a method which combines two or more of these methods.

9. The process according to claim 1, wherein the volatile substances are removed from the gas mixture of the inert gas and the stripped volatile substances so that a gas regeneration rate, expressed by $[(A-B)/A] \times 100$, is in a range of 30 to 100%, where A is a concentration of the volatile substances in the gas mixture and B is the concentration of the volatile substances in the purified inert gas obtained by removing the volatile substances from the gas mixture.

10. A production process for a toner comprising colored polymer particles, the process comprising:
  a first step for generating colored polymer particles by polymerizing in an aqueous medium a polymerizable monomer composition comprising a polymerizable monomer and a colorant;
  a second step for stripping treatment of a dispersion comprising the colored polymer particles; and
  a third step for obtaining the colored polymer particles from the dispersion after completion of the stripping treatment;
  wherein, after the first step is completed, the second step for stripping treatment is carried out by:
  (a) stripping volatile substances from the dispersion by blowing an inert gas into the dispersion to draw the volatile substances into the inert gas;
  (b) removing volatile substances from the gas mixture of the inert gas and the stripped volatile substances; and
  (c) continuing stripping of the volatile substances from the dispersion by circulating a purified inert gas obtained by removing the volatile substances from the gas mixture, and blowing the purified inert gas into the dispersion;
  wherein an inert gas blowing position in stripping step (a) is set so that a ratio $D_2/D_1$ is in a range of 0.5 to 1, where $D_1$ is a maximum liquid depth of the dispersion and $D_2$ is a liquid depth to an inert gas blowing position, and
  wherein stripping is carried out while stirring the dispersion using a stirrer, and the inert gas blowing position is at a distance in a range of 0.05 L to 1.5 L from a center-axis of the stirrer, where L is a horizontal distance from the center-axis of the stirrer to a tip of the stirrer.

11. The production process according to claim 10, wherein in the first step, a step is added for generating core-shell structure colored polymer particles, wherein a polymerizable monomer composition comprising a polymerizable monomer and a colorant is polymerized in an aqueous medium to generate colored polymer particles, then a polymerizable monomer for shell is polymerized in the presence of the colored polymer particles.

12. The production process according to claim 10, wherein the inert gas is selected from a group consisting of nitrogen gas, dried air, carbon dioxide, a noble gas and a mixed gas of two or more thereof.

13. The production process according to claim 10, wherein stripping is continued until a residual polymerizable monomer concentration in the colored polymer particles becomes 80 ppm or less.

14. The production process according to claim 10, wherein stripping is carried out while heating the dispersion to a temperature in a range not lower than a glass transition temperature of the colored polymer particle and lower than 100° C., and blowing the inert gas therein.

15. The production process according to claim 10, wherein the volatile substances are removed from the gas mixture of the inert gas and the stripped volatile substances by:
  (1) a method which condenses the volatile substances in the gas mixture using a bubbling apparatus using cold water or a condenser using chilled water cooling;
  (2) a method which adsorbs the volatile substances in the gas mixture on a porous material using an adsorption tower filled with a porous material;
  (3) a method which agglomerates the volatile substances in the gas mixture using a filter; or
  (4) a method which combines two or more of these methods.

16. The production process according to claim 10, wherein the volatile substances are removed from the gas mixture of the inert gas and the stripped volatile substances so that a gas regeneration rate, expressed by $[(A-B)/A] \times 100$, is in a range of 30 to 100%, where A is the concentration of the volatile substances in the gas mixture and B is a concentration of the volatile substances in the purified inert gas obtained by removing the volatile substances from the gas mixture.

* * * * *